United States Patent
Waters et al.

(10) Patent No.: US 7,376,384 B2
(45) Date of Patent: May 20, 2008

(54) WIRELESS DATA NETWORK SECURITY

(75) Inventors: John Deryk Waters, Bath (GB); James Thomas Edward McDonnell, Malmesbury (GB); Ian Robert Johnson, Bristol (GB); Simon Haydn Baynham, Cardiff (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 471 days.

(21) Appl. No.: 10/426,031

(22) Filed: Apr. 30, 2003

(65) Prior Publication Data

US 2004/0009768 A1 Jan. 15, 2004

(30) Foreign Application Priority Data

Apr. 30, 2002 (GB) ................................. 0209929.9

(51) Int. Cl.
*H04K 3/00* (2006.01)
(52) U.S. Cl. ........................... 455/1; 455/414.1; 455/78
(58) Field of Classification Search ............ 455/414.1, 455/421, 73, 88, 553.1, 90.1, 90.2, 90.3, 455/39, 24, 500, 69, 70, 78, 83, 85, 86, 91, 455/103, 1; 375/316, 295
See application file for complete search history.

(56) References Cited

U.S. PATENT DOCUMENTS

| | | | | |
|---|---|---|---|---|
| 5,532,857 A | * | 7/1996 | Gertel et al. | 398/198 |
| 5,724,168 A | * | 3/1998 | Oschmann et al. | 398/127 |
| 6,529,783 B1 | * | 3/2003 | Combelles et al. | 700/39 |
| 6,606,178 B1 | * | 8/2003 | Rhee et al. | 398/188 |
| 6,832,093 B1 | * | 12/2004 | Ranta | 455/456.4 |
| 6,897,776 B1 | * | 5/2005 | Haycraft | 340/539.24 |
| 6,911,936 B2 | * | 6/2005 | Stayton et al. | 342/182 |
| 7,088,953 B2 | * | 8/2006 | Bongfeldt | 455/24 |
| 7,110,378 B2 | * | 9/2006 | Onggosanusi et al. | 370/334 |
| 2002/0003472 A1 | * | 1/2002 | Haruna et al. | 340/426 |
| 2002/0060639 A1 | * | 5/2002 | Harman | 342/28 |
| 2002/0063653 A1 | * | 5/2002 | Oey et al. | 342/29 |
| 2002/0089960 A1 | * | 7/2002 | Shuster | 370/338 |
| 2003/0026363 A1 | * | 2/2003 | Stoter et al. | 375/345 |
| 2003/0135762 A1 | * | 7/2003 | Macaulay | 713/201 |
| 2004/0103307 A1 | * | 5/2004 | Raphaeli et al. | 713/201 |
| 2004/0203667 A1 | * | 10/2004 | Schroeder et al. | 455/414.1 |
| 2006/0155860 A1 | * | 7/2006 | Funato et al. | 709/228 |
| 2007/0060212 A1 | * | 3/2007 | Shah | 455/572 |

FOREIGN PATENT DOCUMENTS

| | | | |
|---|---|---|---|
| GB | 2186466 | | 8/1987 |
| GB | 2322260 | | 8/1998 |
| GB | 2322260 A | * | 8/1998 |
| WO | WO 98/34412 | * | 8/1998 |

OTHER PUBLICATIONS

U.S. Appl. No. 60/364,224, Inventors: Schroeder et al., Date: Mar. 14, 2002.*

* cited by examiner

*Primary Examiner*—Matthew Anderson
*Assistant Examiner*—Dominic E. Rego

(57) ABSTRACT

Access to a wireless data network to nodes located in a defined operational area is limited by transmitting a network signal within the defined operational area while transmitting a wave that can cause destructive interference with the network signal into a prohibited area adjacent to the defined operational area. The wave that can cause destructive interference is produced by phase and/or amplitude modulating the network signal. The modulation of the network signal includes sweeping the phase and/or amplitude.

26 Claims, 3 Drawing Sheets

WIRELESS DATA NETWORK SECURITY

RELATED APPLICATIONS

The present application is based on, and claims priority from, British Application Number 0209929.9, filed Apr. 30, 2002, the disclosure of which is hereby incorporated by reference herein in its entirety.

FIELD OF THE INVENTION

The invention relates to wireless data networks such as Wireless Local Area Networks (WLANs), and in particular to the area over which such networks extend and thus to the physical locations at which devices can access the network.

BACKGROUND OF THE INVENTION

Wireless data networks such as WLANs are becoming increasingly popular due to their many advantages over wired networks. They provide all the functionality of wired networks without the physical constraints. Although wireless networks can be more costly to install initially, the installation is often quicker and less disruptive to the work environment then for wired networks. Once installed they provide greater physical mobility within the network area for users, which can in some environments in particular provide for much greater productivity. In addition wireless networks can be expanded and altered much more readily than wired networks and thus are more readily adapted to changing requirements than is the case for wired networks.

Wireless networks use radio waves, or in some cases infra red, to communicate information from one point to another without the need for any physical connection. For example a typical WLAN configuration comprises a transmitter/receiver (transceiver) device incorporating an antenna, commonly called an access point, connected to a wired network at a fixed location. The transceiver receives, buffers, and transmits data between the WLAN and the wired network infrastructure. End users access the WLAN through WLAN adapters which are implemented as PC cards in notebook computers, or use ISA (industry standard architecture) or PCI (peripheral component interconnect) adapters in desktop computers, or fully integrated devices within hand held devices such as personal digital assistants (PDAs). The WLAN adapters provide an interface between the network operating system and the radio waves, via an antenna. The nature of the wireless connection is transparent to the network operating system.

As illustrated schematically in FIG. 1, which shows a prior art WLAN, in many WLANs such as WLAN 10 there are a number of access points 12 to a wired network infrastructure 14 in order to provide the appropriate physical coverage, e.g. a whole building 16, or campus. The access points 12 not only provide communication with the wired network infrastructure 14 but also mediate wireless network traffic in the immediate neighbourhood. The area covered by each access point 12 is often referred to as a microcell 18, and these are illustrated by broken lined circles. At any time a device, or node, equipped with a WLAN adapter and accessing the WLAN is associated with a particular access point 12 and its microcell 18. If that device is moved within the coverage of the WLAN then it may move into a different microcell and become associated with a different access point.

If the antennae used by the access points 12 are not directional the area covered by a microcell 18 is approximately circular, (although this will be affected by the environment in which it is located which can produce reflections etc. which alter the basic coverage). Thus to provide fill coverage of an operational area such as a building 16, or campus, by a WLAN the microcells 18 are configured to overlap with each other and with the edge of the area, i.e. building 16, which the WLAN 10 must cover. This provides a security problem, as the coverage of the WLAN 10 extends outside the building 16 potentially providing areas 20, shown shaded in FIG. 1, which may be outside a secure area to which access can be limited and thus provides areas where eavesdroppers may locate a device and seek to gain access to the WLAN 10 and thus to the wired network infrastructure 14 as a whole. Although other security measures may be in place, such as access keys, passwords, encryption etc. these are not infallible, hence it would clearly be s preferable to minimise the areas 20 outside the building or secure area to which the WLAN extends. For simplicity such areas will be referred to in this specification as prohibited areas.

SUMMARY OF THE INVENTION

According to a first aspect of the present invention there is provided a method of limiting access to a wireless data network to nodes located in a defined operational area including, when transmitting a network signal within the defined operational area, transmitting a wave designed to cause destructive interference with the network signal into a prohibited area outside the defined operational area.

The invention provides the advantage that even if an eavesdropper gains access to a prohibited area a node located there cannot receive the network transmissions. This, in combination with the use of other security measures such as access keys, passwords, encryption etc. results in a wireless data network with a very high level of security.

Preferably the wave designed to cause destructive interference is produced by phase and/or amplitude modulating the network signal. The modulation of the network signal may include sweeping the phase and/or amplitude.

The method may further comprise monitoring the effect of the wave designed to cause destructive interference just inside the defined operational area adjacent to the prohibited area, and altering the strength of the wave designed to cause destructive interference transmitted to minimise the effect within the defined operational area.

According to a second aspect of the invention there is provided apparatus for a wireless data network designed to be accessible in a defined operational area including:

an access point comprising a transceiver and associated antenna for transmission of network signals into the defined operational area; and an external transmitter and associated antenna for transmission of at least one destructive interference wave into a prohibited area located adjacent to the defined operational area.

The apparatus preferably further includes signal processing elements which modify the network signals to produce at least one destructive interference wave.

The signal processing elements preferably include a phase modulating element which in use phase modulates the network signals to produce at least one destructive interference wave and/or an amplitude modulating element which in use amplitude modulates the network signals to produce at least one destructive interference wave.

The apparatus preferably further includes an internal receiver and associated antenna for receipt of at least one destructive interference wave within the defined operational area adjacent to the prohibited area and the signal processing elements include a mixing element which in use modifies the amplitude of at least one destructive interference wave to minimize the level of such a wave received by the internal receiver.

The apparatus may further include a plurality of access points, and/or a plurality of external transmitters and associated antennae for transmission of at least one destructive interference wave into one or more prohibited areas located adjacent to the defined operational area and/or a plurality of internal receivers and associated antennae for receipt of destructive interference signals within the defined operational area adjacent to the prohibited area(s).

According to a third aspect of the present invention a method of limiting the physical area over which a wireless data network is accessible, includes, when transmitting a network signal within a defined operational area of the network, transmitting a destructive interference wave into a prohibited area adjacent to the defined operational area, the destructive interference signal being designed to destructively interfere with the network signal within the prohibited area.

According to a fourth aspect of the invention there is provided a method of limiting access to a wireless data network to nodes located within a network operating area including the step of, whilst transmitting a network signal within the network operating area, also transmitting a wave designed to cause destructive interference with the network signal into a prohibited area outside the network operating area.

According to a fifth aspect of the invention there is provided a method of operating a wireless data network such that it is accessible only to nodes located within an operational area around which are located one or more non-operational areas, the method including the steps of, whilst transmitting a network signal into the operational area, (a) creating a wave capable of causing destructive interference with the network signal, and (b) transmitting that wave into the or each non-operational area.

According to a sixth aspect of the invention there is provided apparatus for a wireless data network which is only accessible to nodes located within an operational area around which are located one or more non-operational areas, the apparatus including:

an access point comprising a transceiver and associated antenna for transmission of network signals into the operational area; and an external transmitter and associated antenna for transmission of at least one destructive interference wave into the or each non-operational area.

According to a seventh aspect of the invention there is provided apparatus for a wireless data network only accessible to nodes located within a network operating area around which are located one or more network prohibited areas, the apparatus including:

an access point comprising a transceiver and associated antenna for transmission of network signals into the network operating area;

signal processing elements for modification of the network signals to create at least one destructive interference wave, and an external transmitter and associated antenna for transmission of at least one destructive interference wave into the or each network prohibited area.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Figure 1:
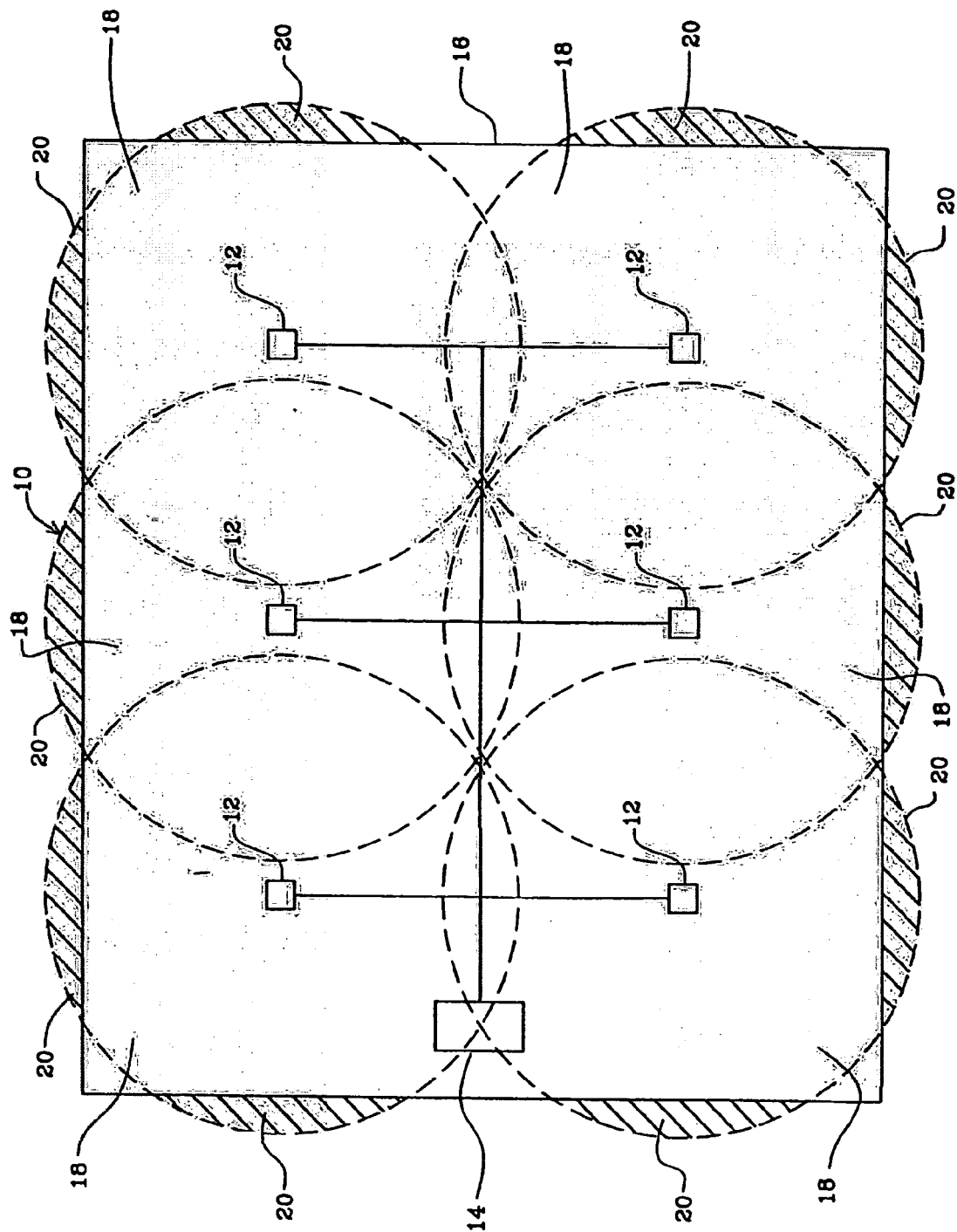
FIG. 1, as previously described, is a schematic illustration of a prior art wireless data network, with a plurality of access points, and incorporating the problem which the present invention addresses.
Figure 2:
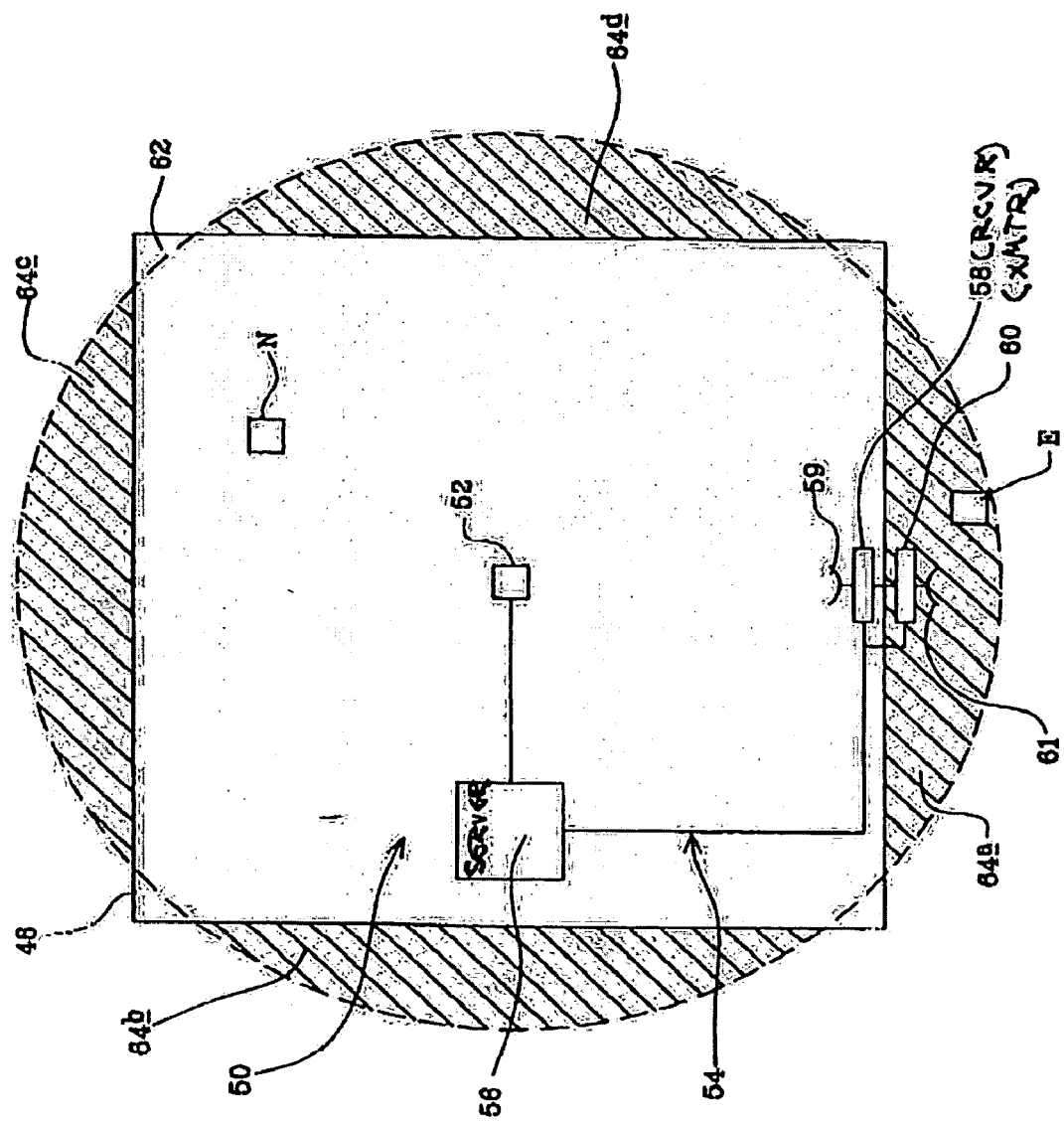
FIG. 2, is a schematic illustration of a wireless data network, with a single access point for simplicity, according to a preferred embodiment of the invention.

Referring to FIG. 2, a WLAN 50, designed to be accessible within an operational area comprising substantially all of building 48, comprises a single access point 52 in the form of a transceiver with associated antenna, along with the appropriate processing capability as in the prior art. The access point 52 is connected to a wired network infrastructure 54 having at least a server 56, a receiver 58 with associated antenna 59 and a transmitter 60 with associated directional antenna 61. The transmitting directional antenna 61 is located on the exterior of the building 48 and the receiving antenna 59 is located inside the building 48 but closely adjacent to the location of the transmitting directional antenna 61.

The access point 52 is located within the building 48 to provide an operational area giving as complete coverage of the inside of the building 48 as is reasonably possible by microcell 62 such that wireless nodes such as N located anywhere within the building 48 can gain access to the WLAN 50. Thus inevitably the coverage of the microcell 62 and thus of the WLAN 50 also extends outside the building 48, into prohibited areas 64a to 64d shown shaded in FIG. 2. In this case prohibited areas 64b to 64d are within a secure area to which access can be controlled but prohibited area 64a is within a publicly accessible area and thus presents a security risk, as wireless nodes such as E located in that prohibited area 64a may be able to gain access to the WLAN 50.

Wireless data networks such as the WLAN 50 operate by transmitting short bursts, of the order of a few milliseconds, of data at a time from the access point to wireless nodes such as N. The network is configured such that nodes should only accept a burst of data if it is received intact as transmitted, and each burst of data includes check digits to enable the receiver in the node N to perform the appropriate checks. If the burst of data is found to be incomplete or corrupted in some way it is rejected in its entirety, and a signal to that effect is sent to the access point which then retransmits the last burst of data to the node concerned.

The WLAN 50 is configured to transmit destructive interference into the prohibited area 64a in order to prevent an eavesdropping node E from receiving bursts of data completely. Provided part of a burst of data is corrupted the receipt of the burst of data by the node E should be prevented, as the node will determine that the burst is corrupted or incomplete in some way, but will not know in what way and thus will not be able to allow for and correct the corruption.

Figure 3:
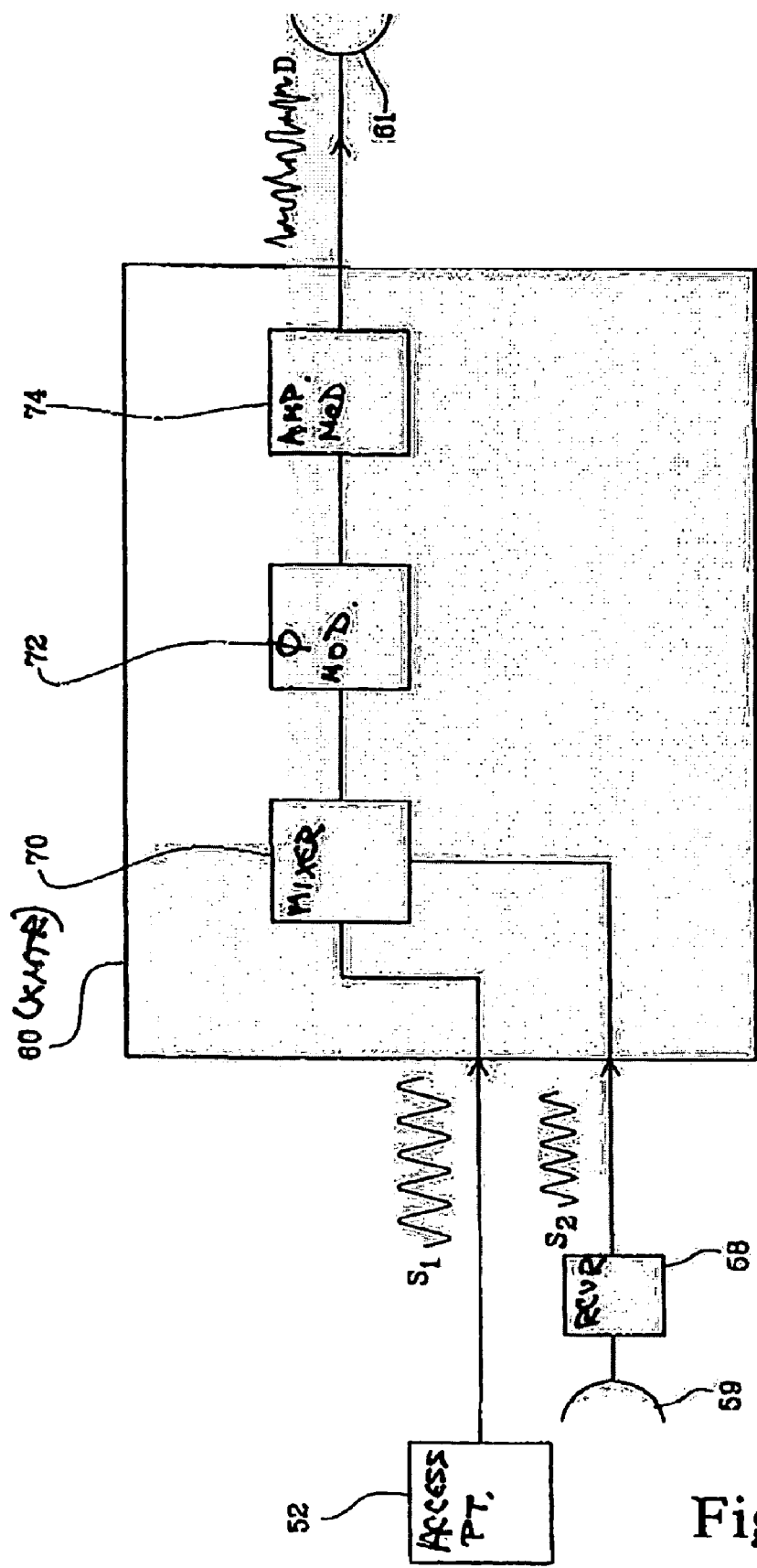
FIG. 3 is a block diagram of the processing apparatus for the wave transmitted for destructive interference.

The WLAN 50 achieves this destructive interference as follows, with particular reference to FIG. 3. The burst of data, signal $S_1$, transmitted by the access point 52 is also sent to the external transmitter 60 which incorporates signal processing elements 70, 72, 74. Signal $S_2$, received by the receiving antenna 59, is also sent to the external transmitter 60, and is used, as will be discussed later, in mixing element 70 to control the magnitude of the destructive wave D transmitted by the external transmitter 60 via antenna 61. The signal $S_1$ as modified by $S_2$ in 70 is passed to phase modulation element 72 where its phase is modulated, and to amplitude modulation element 74 where its amplitude is also modulated. The resulting destructive wave D is sent to the directional antenna 61 from where it is transmitted into prohibited area 64a.

The signal $S_1$ as transmitted from the access point 52 is phase and amplitude modulated, to create the destructive wave D, before being transmitted by directional antenna 61 in order to maximise the probability of some destructive interference occurring at some point in the burst of data at the location of eavesdropping node E. The most effective manner in which to phase and amplitude modulate the signal $S_1$ is by sweeping the amplitude and phase during the burst of data, as this will inevitably result in destructive interference at some point.

The reason for the inclusion in the WLAN 50 of the internal receiver 58 and receiving antenna 59 is to monitor the effects, if any, within the building 48 of the transmission of destructive wave D by directional antenna 61. Although antenna 61 is directional, imperfections in that directionality and reflections from surrounding structures such as buildings can result in the destructive wave D also penetrating within the building 48 and affecting the coverage of the WLAN 50 within the operational area of building 48. Hence the magnitude of electromagnetic energy just inside the building 48 is monitored by receiver 58 via receiving antenna 59 and the magnitude of the destructive wave D is altered by mixing element 70 to minimise the effect of that wave at the receiving antenna 59.

Although the WLAN described above incorporates a single access point the invention is equally applicable to WLANs incorporating a plurality of such access points, or indeed to other forms of wireless data network. In addition, although the WLAN 50 is described with a single combination of internal receiver and external transmitter to provide destructive interference on one side of the building it is clearly within the scope of the invention for WLANs to incorporate a plurality of such combinations to provide for destructive interference over a greater physical area and/or in different directions with respect to the building or other secure area. Furthermore, embodiments can also omit the internal receiver as in some cases it may be possible to ensure that the external transmitter transmits a wave which does not penetrate back into the building, or secure area, and interfere with the correct access to the WLAN.

The embodiment of the invention described above is by way of example only, and other embodiments with variations will still fall within the scope of the invention. For example although the phase and amplitude modulation of the data burst $S_1$ to produce the destructive wave D are described as being in the form of sweeping the phase and amplitude during the burst other forms of modulation can be used. At its simplest the destructive wave D can simply comprise the signal $S_1$ 180 degrees out of phase with that transmitted by the access point. Also the modulation may be just of the phase or just of the amplitude, although the probability of destructive interference is usually maximised if both kinds of modulation are used.

The invention claimed is:

1. A method of limiting access to a wireless data network to nodes located in a defined operational area, the method comprising simultaneously transmitting (a) a network signal within the defined operational area, and (b) a wave that adversely affects reception of the network signal into a prohibited area outside the defined operational area to prevent or assist in preventing reception of the network signal by an eavesdropping node that might be in the prohibited area, the wave being transmitted so it does not adversely affect reception of the network signal in the defined operational area.

2. A method according to claim 1 wherein the wave causes destructive interference with the network signal and is produced by at least one of the phase and amplitude modulating the network signal.

3. A method according to claim 2 wherein the modulation of the network signal includes sweeping at least one of the phase and amplitude.

4. A method according to claim 1 wherein the wave causes destructive interference with the network signal and further comprising monitoring the effect of the wave that causes destructive interference just inside the defined operational area adjacent to the prohibited area, and altering the strength of the wave that causes destructive interference to minimize the effect within the defined operational area, the altering step being performed in response to the monitoring step.

5. The method of claim 1, wherein the defined operational area is within a building, and the prohibited area is outside the building.

6. The method of claim 1, wherein the data network is a WLAN.

7. A method according to claim 1 wherein the wave adversely affects reception of the network signal into the prohibited area outside the defined operational area to prevent reception of the network signal by an eavesdropping node in the prohibited area.

8. Apparatus for a wireless data network designed to be accessible in a defined operational area, the apparatus including:
   a transmitter and associated radiator for transmission of wireless network signals into the defined operational area; and
   an external transmitter and associated radiator for transmission of at least one destructive interference wave into a prohibited area located adjacent to and outside the defined operational area to prevent or assist in preventing reception of the network signal by an eavesdropping node that might be in the prohibited area, the external transmitter and associated radiator being arranged so the wave does not adversely affect reception of the network signal in the defined operational area.

9. Apparatus for a wireless data network according to claim 8 wherein the at least one wave is arranged to destructively interfere with the wireless network signals, further including signal processing elements for modifying the network signals to produce the at least one destructive interference wave.

10. Apparatus for a wireless data network according to claim 9 wherein the signal processing elements include a phase modulating element for phase modulating the network signals to produce the at least one destructive interference wave.

11. Apparatus for a wireless data network according to claim 9 wherein the signal processing elements include an amplitude modulating element for amplitude modulating the network signals to produce the at least one destructive interference wave.

12. Apparatus for a wireless data network according to claim 9 further including an internal receiver and associated transducer for receipt of the at least one destructive interference wave within the defined operational area adjacent to the prohibited area; and the signal processing elements being arranged to respond to the magnitude of the at least one destruction interference wave received thereby for modifying the amplitude of the at least one destructive interference wave to minimize the level of the at least one destructive interference wave received by the internal receiver.

13. Apparatus for a wireless data network according to claim 12 further including a plurality of internal receivers and associated transducers for receipt of at least one destructive interference wave within the defined operational area adjacent to the at least one prohibited area, the plural internal receivers being substantially the same as the internal receiver of claim 12.

14. Apparatus for a wireless data network according to claim 8 wherein the transmission of wireless network signals is included in an access point for coupling the wireless network signals to another network.

15. The apparatus of claim 14, wherein the network includes a plurality of the access points.

16. Apparatus for a wireless data network according to claim 8 further including a plurality of external transmitters and associated radiators for transmission of destructive interference waves into one or more prohibited areas located adjacent to the defined operational area to prevent or assist in preventing reception of the network signal by any eavesdropping node that might be in any of the one or more prohibited areas.

17. The apparatus of claim 8, wherein the defined operational area is within a building, and the prohibited area is outside the building.

18. The apparatus of claim 8, wherein the transmitter is a WLAN transmitter.

19. A method of limiting the physical area over which a wireless data network is accessible by a node, the method comprising transmitting a network signal within a defined operational area of the network while creating and transmitting a wave into a prohibited area adjacent to and outside the defined operational area, the wave being capable of adversely affecting reception of the network signal within the prohibited area to prevent or assist in preventing reception of the network signal by an eavesdropping node that might be in the prohibited area, the wave being transmitted so it does not adversely affect reception of the network signal in the defined operational area.

20. A method according to claim 19 wherein the wave is a destructive interference wave.

21. A method of limiting access to a wireless data network to nodes located within a network operating area, the method including the step of, whilst transmitting a network signal within the network operating area, transmitting a wave that can adversely affect reception of the network signal into a prohibited area outside the network operating area to prevent or assist in preventing reception of the network signal by an eavesdropping node that might be in the prohibited area, the wave being transmitted so it does not adversely affect reception of the network signal in the defined operational area.

22. A method according to claim 21 wherein the wave is a destructive interference wave.

23. A method of operating a wireless data network such that it is accessible only to nodes located within an operational area around which are located one or more non-operational areas, the method including the steps of, whilst transmitting a network signal into the operational area, (a) creating a wave that adversely affects reception of the network signal, and (b) transmitting that wave into the one or more non-operational areas but not into operational area to enable reception of the network signal in the operational area and to prevent reception of the network signal by an eavesdropping node that might be in the prohibited area and one or more non-operational areas.

24. A method according to claim 23 wherein the wave is a wave that destructively interferes with the network signals.

25. Apparatus for a wireless data network which is only accessible to nodes located within an operational area that are adjacent one or more non-operational areas, the apparatus including:
   a transmitter and associated radiator for transmission of wireless network signals into the operational area; and
   an external transmitter and associated antenna for transmission of at least one wave into the one or more non-operational areas to prevent or assist in preventing reception of the network signal by an eavesdropping node that might be in the prohibited area and one or more non-operational areas, the external transmitter and associated radiator being arranged so the wave does not adversely affect reception of the network signal in the defined operational area.

26. The apparatus of claim 25 wherein the interference wave is a destructive interference wave, further including:
   a monitor for the magnitude of the destructive interference wave as incident on a region of the network operating area;
   signal processing elements for modification of the destructive interference wave based on the monitored magnitude of the at least one destructive interference wave.

* * * * *